US012760872B2

(12) United States Patent
Hsu

(10) Patent No.: US 12,760,872 B2
(45) Date of Patent: Oct. 13, 2026

(54) RETAINING RING SWITCHING STRUCTURE FOR LUMINAIRE BODY AND LUMINAIRE

(71) Applicant: DONGGUAN JIASHENG LIGHTING TECHNOLOGY CO., LTD., Dongguan (CN)

(72) Inventor: Chih-pin Hsu, Dongguan (CN)

( * ) Notice: Subject to any disclaimer, the term of this patent is extended or adjusted under 35 U.S.C. 154(b) by 0 days.

(21) Appl. No.: 19/383,461

(22) Filed: Nov. 7, 2025

(65) Prior Publication Data

US 2026/0063280 A1 Mar. 5, 2026

(30) Foreign Application Priority Data

Sep. 3, 2025 (CN) ......................... 202521902435.5

(51) Int. Cl.
*F21V 21/02* (2006.01)

(52) U.S. Cl.
CPC .................................. *F21V 21/02* (2013.01)

(58) Field of Classification Search
CPC ........... F21V 21/02; F21V 17/14; F21V 17/18
See application file for complete search history.

(56) References Cited

U.S. PATENT DOCUMENTS

| | | | | |
|---|---|---|---|---|
| 10,168,029 B1 * | 1/2019 | Hsu | ......................... | F21S 8/043 |
| 12,049,999 B1 * | 7/2024 | Xu | ......................... | F21V 17/002 |
| 12,078,333 B1 * | 9/2024 | Xu | ......................... | F21V 17/104 |
| 2018/0356057 A1 * | 12/2018 | Xu | ......................... | F21S 8/04 |
| 2021/0262625 A1 * | 8/2021 | Peng | ......................... | F21S 8/043 |

* cited by examiner

*Primary Examiner* — Tsion Tumebo

(57) ABSTRACT

A retaining ring switching structure for a luminaire body is configured to connect the luminaire body to various retaining rings. It includes a luminaire body connecting structure disposed on the luminaire body, a retaining ring connecting structure disposed on the retaining ring, and a connecting member disposed between the luminaire body and the retaining ring. The connecting member includes a body shaped to conform to the luminaire body; a first connecting structure disposed on a side of the body corresponding to the luminaire body and matching the luminaire body connecting structure to achieve a detachable connection between the connecting member and the luminaire body, and a second connecting structure disposed on a side of the body corresponding to the retaining ring and matching the retaining ring connecting structure to achieve a detachable connection between the connecting member and the retaining ring.

10 Claims, 9 Drawing Sheets

RETAINING RING SWITCHING STRUCTURE FOR LUMINAIRE BODY AND LUMINAIRE

TECHNICAL FIELD

The present disclosure relates to the technical field of assembling luminaires, in particular to a retaining ring switching structure for a luminaire body and a luminaire.

BACKGROUND

In the prior art, ceiling lamps and semi-ceiling lamps are widely used in luminaires. Compared with pendant lamps, ceiling lamps and semi-ceiling lamps require less space because their mounting surfaces are flush with a wall surface, and they are less susceptible to dust and require less cleaning. However, ceiling lamps and semi-ceiling lamps generally have monotonous appearances, resulting in relatively poor decorative aesthetics.

To overcome the shortcoming, ceiling lamps and semi-ceiling lamps may be provided with retaining rings, which are sleeved around a periphery of the lamp. The retaining rings provide different visual effects to the ceiling lamps or semi-ceiling lamps, thereby improving the overall decorative aesthetics. However, since a mounting surface fits snugly against the wall, it is difficult to install or remove a retaining ring of a ceiling lamp or a semi-ceiling lamp in the prior art. After installation, replacement is often challenging, which is unfavorable for broader application and promotion.

Therefore, the prior art needs to be further improved and developed.

SUMMARY

In view of the deficiencies in the prior art, the present disclosure aims to provide a retaining ring switching structure for a luminaire body and a luminaire, so as to solve the problems that it is difficult to install or remove a retaining ring of a ceiling lamp or a semi-ceiling lamp in the prior art. After installation, replacing the retaining ring is often challenging, which is unfavorable for broader application and promotion.

The present disclosure adopts the following technical solutions:

In a first aspect, the present disclosure provides a retaining ring switching structure for a luminaire body for connecting the luminaire body to various retaining rings. The retaining ring switching structure includes a luminaire body connecting structure disposed on the luminaire body, a retaining ring connecting structure disposed on the retaining ring, and a connecting member disposed between the luminaire body and the retaining ring. The connecting member includes:

- a body, where the body is shaped to conform to the luminaire body;
- a first connecting structure, where the first connecting structure is disposed on a side of the body corresponding to the luminaire body, and matches the luminaire body connecting structure to achieve a detachable connection between the connecting member and the luminaire body; and
- a second connecting structure, where the second connecting structure is disposed on a side of the body corresponding to the retaining ring, and matches the retaining ring connecting structure to achieve a detachable connection between the connecting member and the retaining ring. Accordingly, the luminaire body is connected to various retaining rings through the connecting member.

In one embodiment, the first connecting structure includes a rib extending perpendicularly from the body toward the luminaire body, and the luminaire body connecting structure is a slot that matches the rib. The rib is inserted into the slot to achieve the detachable connection between the connecting member and the luminaire body.

In one embodiment, a cross-section of the rib perpendicular to its extending direction is parabolic, and the slot is a parabolic slot corresponding to the rib to restrict relative movement between the connecting member and the luminaire body after the rib is inserted into the slot.

In one embodiment, a handle is formed on the body away from the extending direction of the rib to facilitate insertion of the rib into the slot and removal of the rib from the slot.

In one embodiment, the retaining ring connecting structure includes:

- a supporting base, where the supporting base is arranged to extend inwardly in a direction perpendicular to the retaining ring for supporting the luminaire body; and
- a retaining protrusion, where the retaining protrusion is fixed to an inner side of the retaining ring, and the retaining groove is formed between the retaining protrusion and the supporting base; and the retaining ring is detachably connected to the connecting member via the retaining groove.

In one embodiment, the second connecting structure includes a protruding guide rail extending in a helical direction. The protruding guide rail is screwed into the retaining groove to achieve the detachable connection between the connecting member and the retaining ring.

In one embodiment, a stop member is formed by a protrusion at a lowest end perpendicular to the protruding guide rail, to prevent the retaining ring from slipping off the connecting member.

In one embodiment, the retaining protrusion is parabolic in shape, and a retaining groove is formed between a lowest point of the retaining protrusion and the supporting base.

In one embodiment, the retaining ring switching structure includes more than two connecting members, and a same number of luminaire body connecting structures are symmetrically arranged on the luminaire body, and a same number of retaining ring connecting structures are symmetrically arranged on the retaining ring.

In a second aspect, the present disclosure provides a luminaire, including the retaining ring switching structure for a luminaire body and the retaining ring as described in any of the above embodiments.

The present disclosure provides a retaining ring switching structure for a luminaire body and a luminaire. The retaining ring switching structure is configured to connect the luminaire body to various retaining rings, and includes a luminaire body connecting structure disposed on the luminaire body, a retaining ring connecting structure disposed on the retaining ring, and a connecting member disposed between the luminaire body and the retaining ring. The connecting member includes: a body, where the body is shaped to conform to the luminaire body; a first connecting structure, where the first connecting structure is disposed on a side of the body corresponding to the luminaire body, and matches the luminaire body connecting structure to achieve a detachable connection between the connecting member and the luminaire body; and a second connecting structure, where the second connecting structure is disposed on a side of the body corresponding to the retaining ring, and matches the retaining ring connecting structure to achieve a detachable connection between the connecting member and the retaining ring. Accordingly, the luminaire body is connected to various retaining rings through the connecting member. The retaining ring switching structure for a luminaire body of the present disclosure achieves the installation of the luminaire body and the retaining ring through cooperation between a connecting member and connecting structures respectively provided on the luminaire body and the retaining ring, reducing an operating space needed for installing and removing the retaining ring, thereby enabling convenient and efficient installation and removal of the retaining ring even when the mounting surface of the luminaire body fits snugly against the wall. This ensures operational efficiency when replacing the retaining ring for the luminaire body and facilitates further market promotion.

DETAILED DESCRIPTIONS OF THE EMBODIMENTS

Figure 1:
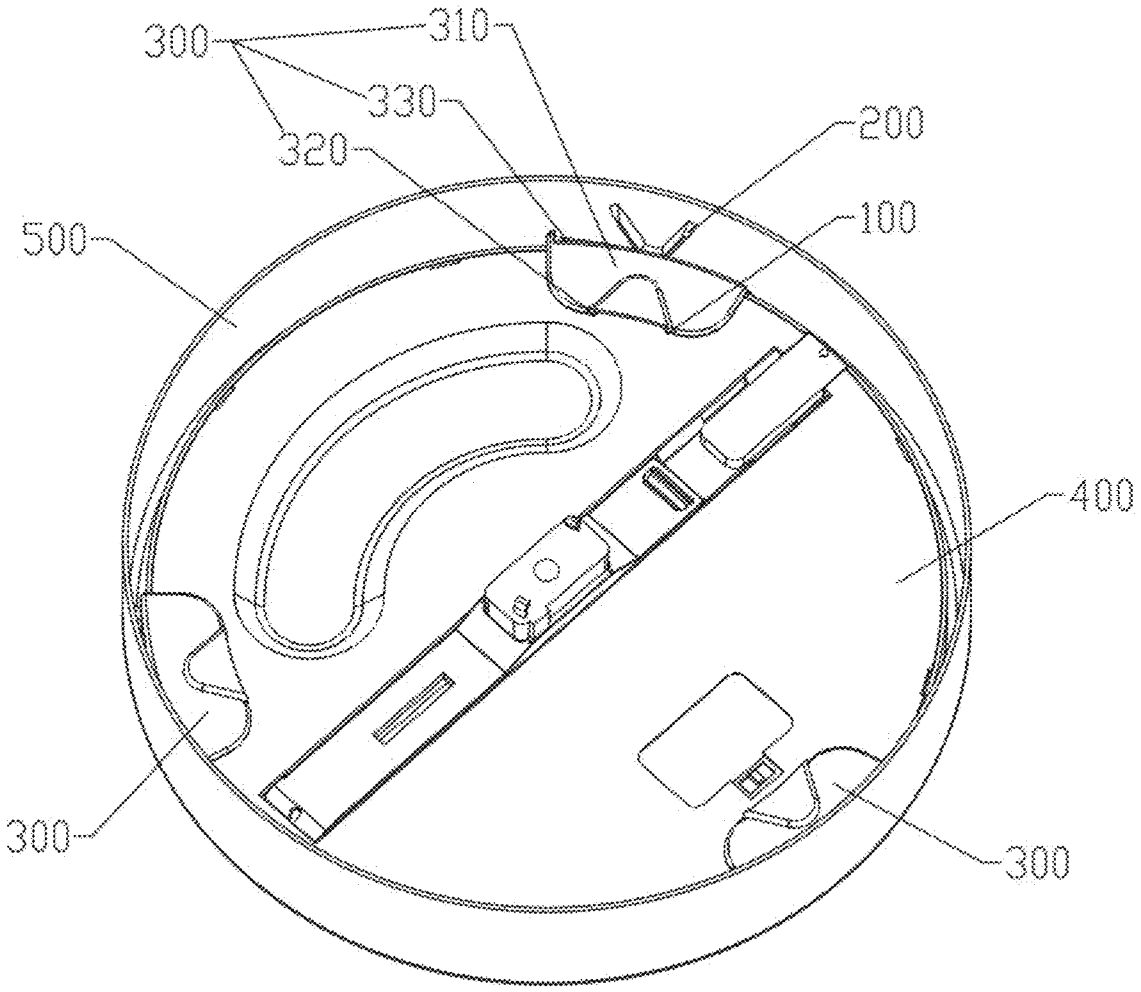
FIG. 1 is a schematic diagram of the luminaire after assembly according to the present disclosure.

The present disclosure provides a retaining ring switching structure for a luminaire body and a luminaire. In order to make the objectives, technical solutions, and effects of the present disclosure clearer, the present disclosure will be further described in detail below. It should be understood that the specific embodiments described herein are merely used to explain the present disclosure and are not intended to limit the present disclosure.

It should be noted that the terms "center", "upper", "lower", "left", "right", "inner", "outer", "vertical", "horizontal", etc. indicate azimuthal or positional relations on the basis of those shown in the drawings only for ease of description of the present disclosure and for simplicity of description, and are not intended to indicate or imply that the referenced structure must have a particular orientation and be constructed in a particular orientation, and thus may not be construed as a limitation on the present disclosure.

In addition, unless otherwise specified for the articles in the context, "a/an" and "the" can generally refer to either a single or multiple instances. Under the condition that embodiments of the present disclosure involve descriptions of "first", "second", etc., the descriptions of "first", "second", etc. are for descriptive purposes only and are not to be construed as indicating or implying their relative importance or implicitly specifying the number of indicated technical features. Thus, a feature defined with "first" and "second" may explicitly or implicitly include at least one of the features. In addition, the technical solutions of the embodiments may be combined with one another, which must be based on the achievement by those of ordinary skill in the art, and when the combinations of the technical solutions contradict one another or cannot be achieved, it should be considered that the combinations of the technical solutions do not exist and do not fall within the scope of protection claimed in the present disclosure.

Since a mounting surface of a ceiling lamp fits snugly against a wall, it can effectively prevent dust from entering the ceiling lamp, and prevent a mounting structure from being exposed, thereby improving the visual effect and making an entire space more concise and aesthetically pleasing. For a semi-ceiling lamp, by introducing a retaining ring, the semi-ceiling lamp can provide a visual effect similar to that of the ceiling lamp. By assembling a replaceable retaining ring with a luminaire body, different visual effects can be provided for both the ceiling lamp and the semi-ceiling lamp, thereby avoiding a monotonous and dull appearance. However, since the mounting surface fits snugly against the wall, the ceiling lamp or the semi-ceiling lamp often requires specialized tools for installation and removal. This undoubtedly increases the difficulty of installing and removing the retaining ring, thereby reducing the efficiency of replacing the retaining ring, which is unfavorable for the market adoption of replaceable retaining rings.

In view of the above technical problems, the present disclosure provides a retaining ring switching structure for a luminaire body. Through cooperation between a connecting member and connecting structures respectively provided on the luminaire body and the retaining ring, the installation of the luminaire body and the retaining ring is achieved, reducing an operating space needed for installing and removing the retaining ring. The retaining ring can be installed on or removed from the luminaire body without removing the luminaire body from the mounting surface, thereby enabling convenient and efficient installation and removal of the retaining ring even when the mounting surface of the luminaire body fits snugly against the wall. This ensures operational efficiency when replacing the retaining ring for the luminaire body and facilitates further market promotion.

Figure 2:
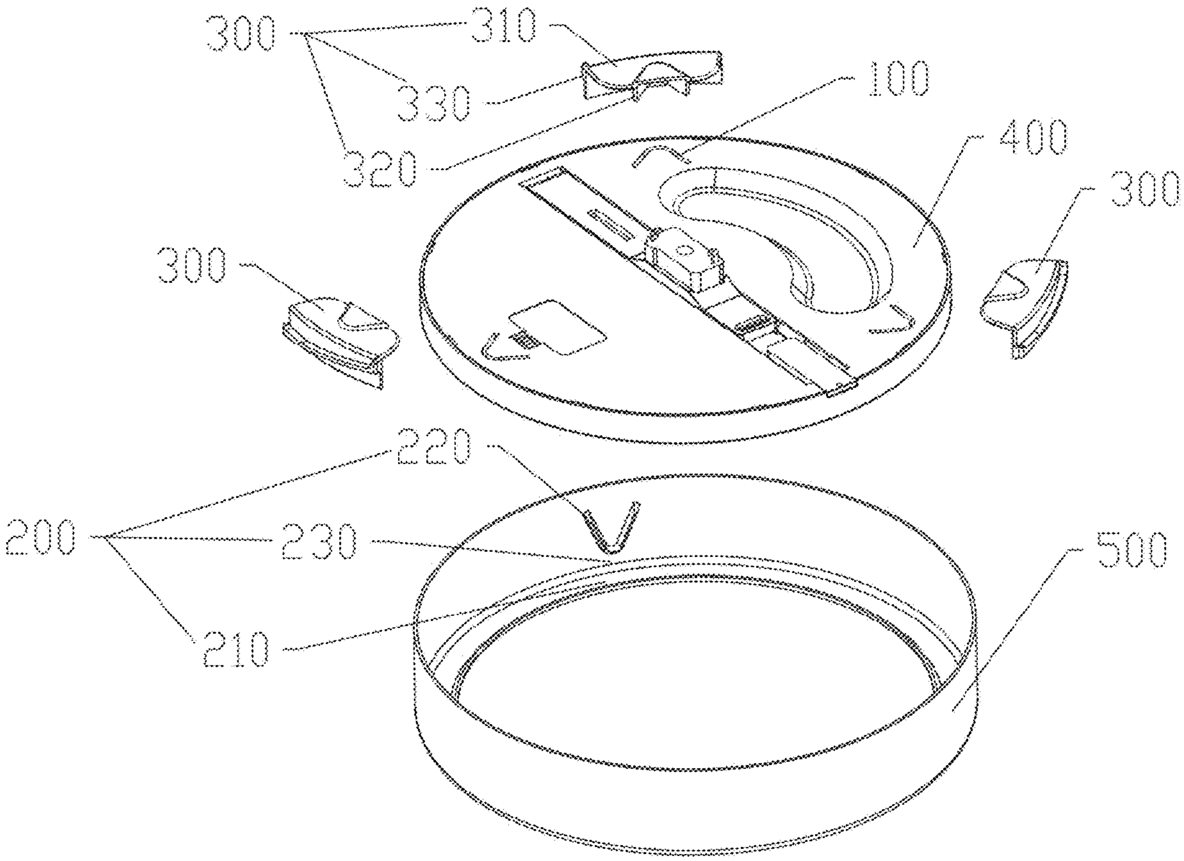
FIG. 2 is an exploded view of a connecting member, a luminaire, and a retaining ring according to the present disclosure.

Specifically, as shown in FIGS. 1 and 2, the present disclosure provides a retaining ring switching structure for a luminaire body for connecting the luminaire body 400 to retaining rings 500 of different appearances. The retaining ring switching structure includes a luminaire body connecting structure 100 disposed on the luminaire body 400, a retaining ring connecting structure 200 disposed on the retaining ring 500, and a connecting member 300 disposed between the luminaire body 400 and the retaining ring 500. The connecting member 300 includes a body 310, a first connecting structure 320, and a second connecting structure 330. The body 310 is shaped to conform to the luminaire body 400. The first connecting structure 320 is disposed on a side of the body 310 corresponding to the luminaire body 400, and matches the luminaire body connecting structure 100 to achieve a detachable connection between the connecting member 300 and the luminaire body 400. The second connecting structure 330 is disposed on a side of the body 310 corresponding to the retaining ring 500, and matches the retaining ring connecting structure 200 to achieve a detachable connection between the connecting member 300 and the retaining ring 500. Accordingly, the luminaire body 400 is connected to the retaining rings 500 of different appearances through the connecting member 300. By using the connecting member 300 as a connecting tool between the luminaire body 400 and the retaining ring 500, the retaining ring 500 may be installed or removed without removing the luminaire body 400 from a mounting surface. This reduces the operating space required, simplifies the installation and removal process, and enables a user to replace different retaining rings mounted on the luminaire body at any time as needed.

Figure 4:
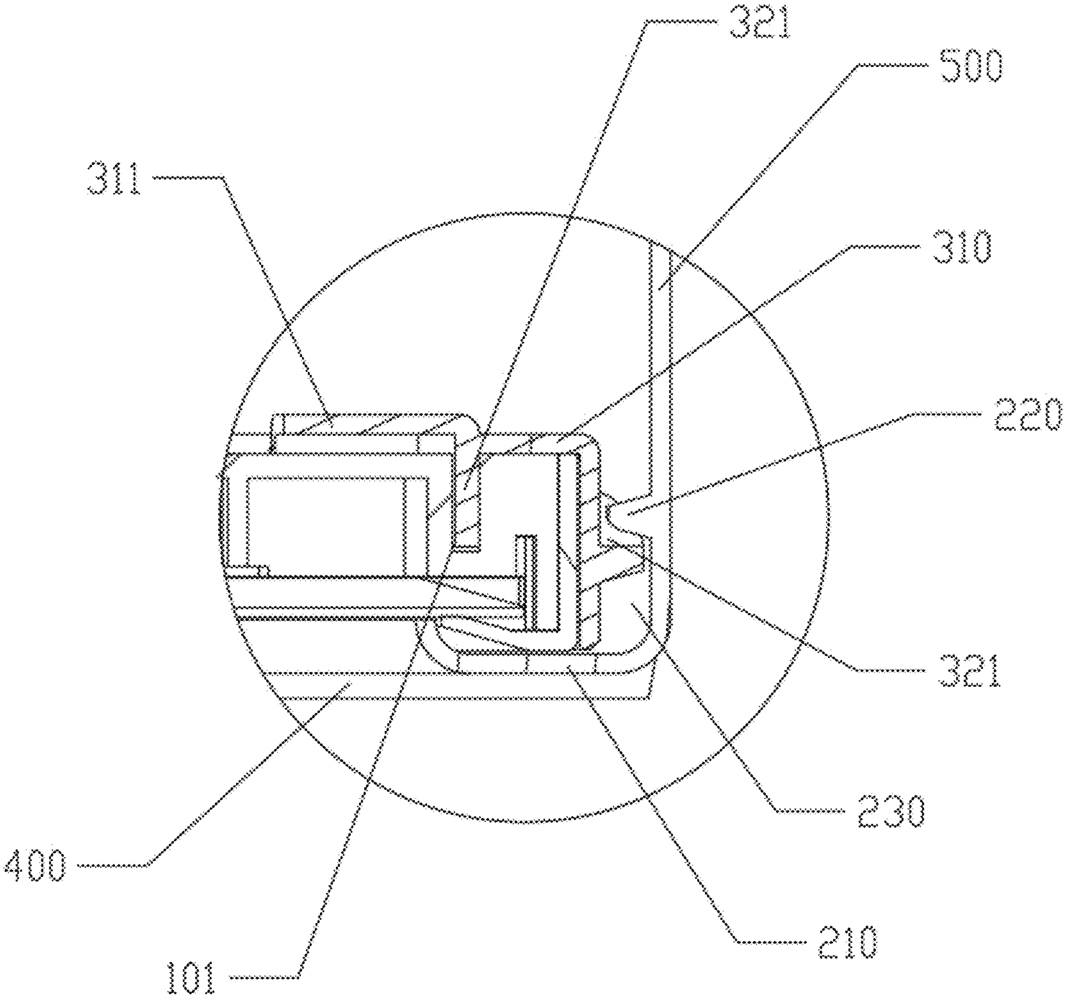
FIG. 4 is an enlarged schematic diagram of position A in FIG. 3.
Figure 5:
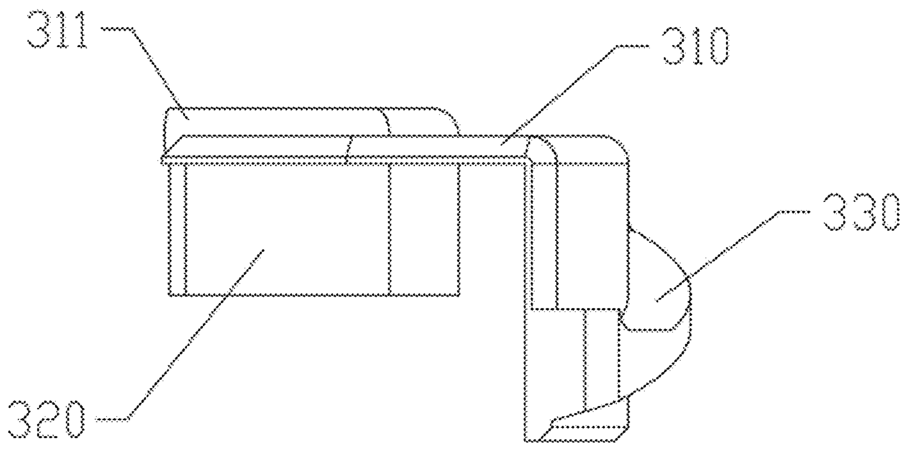
FIG. 5 is a right-side view of a connecting member according to the present disclosure.
Figure 7:
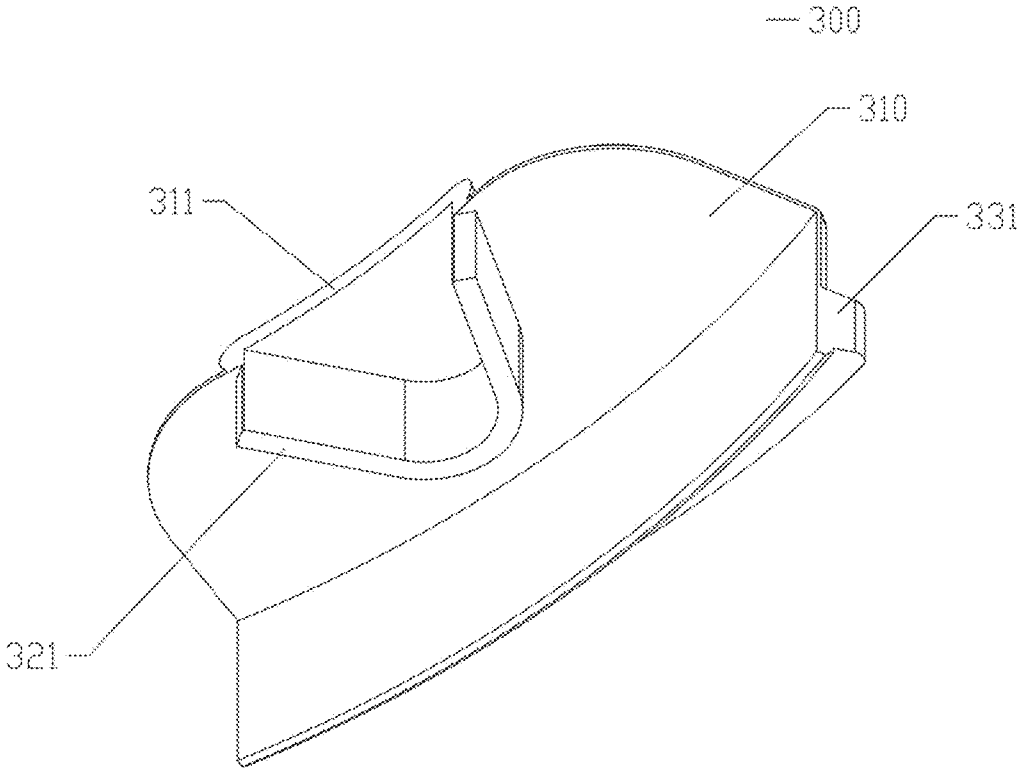
FIG. 7 is a perspective view of a connecting member in another direction according to one embodiment of the present disclosure.

In one embodiment, as shown in FIGS. 4, 5 and 7, the first connecting structure 320 is a rib 321 extending perpendicularly from the body 310 toward the luminaire body 400, and the luminaire body connecting structure 100 is a slot 101 that matches the rib 321. The rib 321 is inserted into the slot 101 to achieve a detachable connection between the connecting member 300 and the luminaire body 400. By providing the rib 321 extending in a specific direction and a corresponding matching slot 101, the connecting member 300 can be latched to the luminaire body 400 with a simple structure. Optionally, the slot 101 may have a width slightly smaller than a thickness of the rib 321, or an inclination angle inside the slot 101 forms a slight angle relative to an extending direction of the rib 321, thereby achieving a detachable connection between the slot 101 and the rib 321 through interference fit. This ensures that after the rib 321 is inserted into the slot 101, the connecting member 300 will not move in the extending direction of the rib 321 without applying external force, thereby improving stability after installation.

In one embodiment, as shown in FIGS. 2 and 7, a cross-section of the rib 321 perpendicular to its extending direction is parabolic, and the first connecting structure 320 is a parabolic slot (that is, a parabolic slot 101) corresponding to the rib 321 to restrict relative movement between the connecting member 300 and the luminaire body 400 after the rib 321 is inserted into the slot 101. By providing the rib 321 and the slot 101 in parabolic shapes, the rib 321 is restricted from movement in a perpendicular to the extending direction thereof after the rib 321 is inserted into the slot 101. The connecting member 300 can only move relative to the luminaire body 400 in an extending direction of the first connecting structure 320, that is, the rib 321, thereby ensuring that the connecting member 300 and the luminaire body 400 do not move relative to each other during installation of the retaining ring 500.

Figure 6:
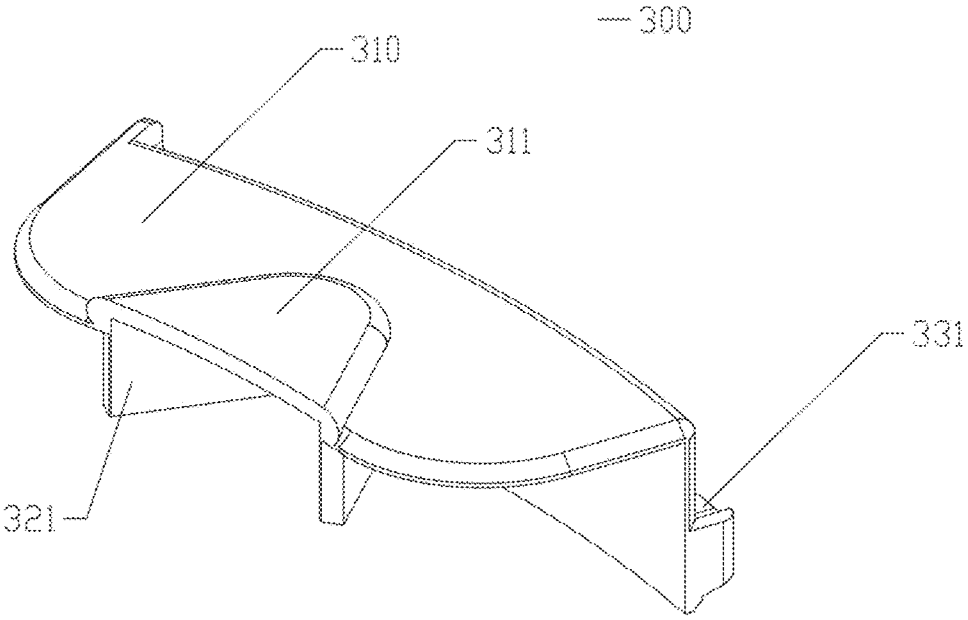
FIG. 6 is a perspective view of a connecting member according to one embodiment of the present disclosure.

In one embodiment, as shown in FIGS. 5 and 6, a handle 311 is formed on the body 310 away from the extending direction of the rib 321 to facilitate insertion of the rib 321 into the slot 101 and removal of the rib 321 from the slot 101. The handle 311 is disposed above the rib 321, such that the handle 311 and the rib 321 form a connecting line in a vertical direction, making the user easier and more convenient to insert the rib 321 into the slot 101 and withdraw the rib 321 from the slot 101, thereby improving ease of use.

In one embodiment, as shown in FIGS. 2 and 4, the retaining ring connecting structure 200 includes a supporting base 210, a retaining protrusion 220, and a retaining groove 230. The supporting base 210 is arranged to extend inwardly in a direction perpendicular to the retaining ring 500 for supporting the luminaire body 400. The retaining protrusion 220 is fixed to an inner side of the retaining ring 500, and the retaining groove 230 is formed between the retaining protrusion and the supporting base 210. The retaining ring 500 achieves a detachable connection with the connecting member 300 through the retaining groove 230. Since the supporting base 210 is configured to support the luminaire body 400, a relative position between the retaining ring 500 and the luminaire body 400 is ensured during installation of the retaining ring 500. The retaining groove 230 is formed between the retaining protrusion 220 and the supporting base 210, the retaining ring connecting structure 200 that matches the second connecting structure 330 of the connecting member 300 is formed, thereby enabling a detachable connection between the retaining ring 500 and the connecting member 300, and consequently achieving a detachable connection between the retaining ring 500 and the luminaire body 400.

Figure 8:
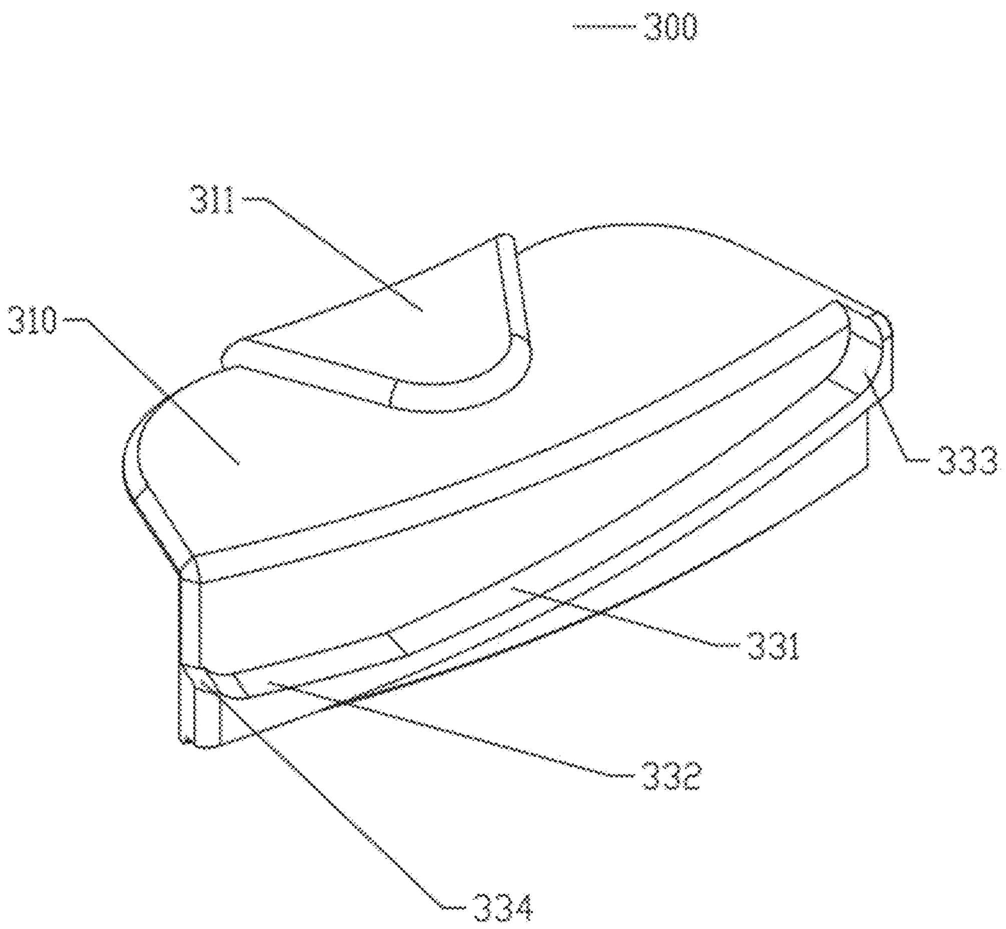
FIG. 8 is a perspective view of a connecting member in yet another direction according to one embodiment of the present disclosure.

In one embodiment, as shown in FIGS. 4, 5 and 8, the second connecting structure 330 is a protruding guide rail 331 extending in a helical direction. The protruding guide rail 331 is screwed into the retaining groove 230 to achieve a detachable connection between the connecting member 300 and the retaining ring 500. By providing the protruding guide rail 331 with a matching helical structure, the second connecting structure 330 becomes a thread-like structure on the body 310 facing the retaining ring 500. Therefore, after the luminaire body 400 is placed on the supporting base 210, the retaining ring 500 can be rotated to enable the protruding guide rail 331 to be engaged into the retaining groove 230 formed between the retaining protrusion 220 and the supporting base 210, thereby realizing a detachable connection between the connecting member 300 and the retaining ring 500 through the cooperation between the retaining protrusion 220, the supporting base 210 and the protruding guide rail 331.

Figure 9:
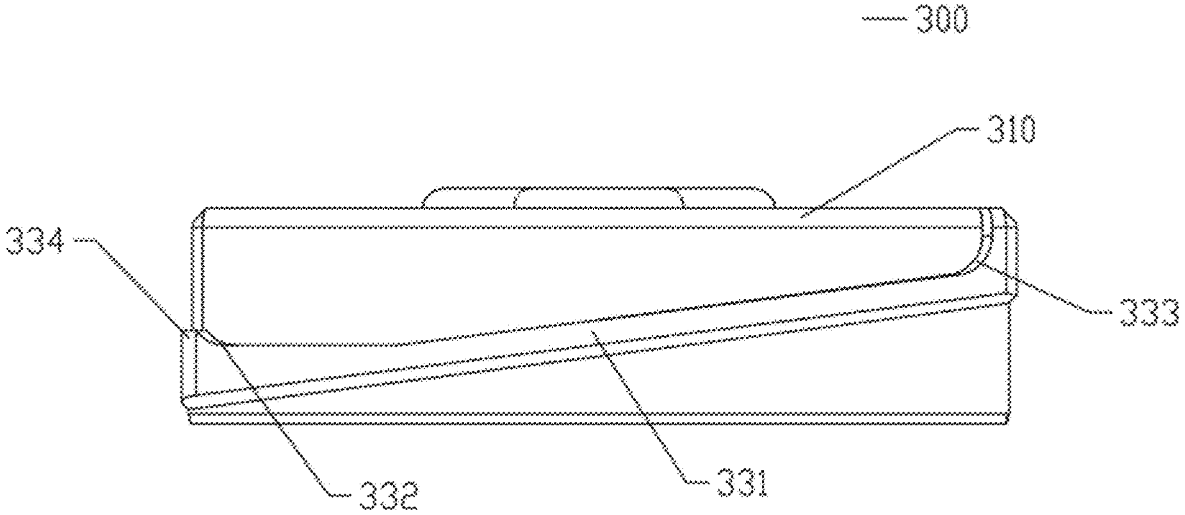
FIG. 9 is a rear view of a connecting member according to one embodiment of the present disclosure.

In one embodiment, as shown in FIGS. 8 and 9, a stop member 334 is formed by a protrusion at a lowest end 332 perpendicular to the protruding guide rail 331, to prevent the retaining ring 500 from slipping off the connecting member 300. After the retaining ring 500 is rotated to enable the protruding guide rail 331 of the second connecting structure 330 to be engaged into the retaining groove 230 between the supporting base 210 and the retaining protrusion 220, the retaining ring 500 is then fixedly installed to the luminaire body 400. However, during use, due to gravity and possible vibration, the retaining ring 500 and the luminaire body 400 may be subjected to relative displacement. The retaining ring 500 slides downward relative to the luminaire body 400 and the connecting member 300, in this case, the retaining protrusion 220 moves along the protruding guide rail 331 toward the lowest end 332, and is blocked by the stop member 334 at the lowest end 332, thereby preventing further slippage that could lead to disengagement of the retaining ring 500 from the luminaire body 400, ensuring safety and stability during use.

In one embodiment, as shown in FIG. 2, the retaining protrusion 220 is parabolic in shape, and the retaining groove 230 is formed between a lowest point of the retaining protrusion 220 and the supporting base 210. The retaining protrusion 220 in a parabolic shape reduces the manufacturing difficulty while maintaining sufficient mechanical strength of the retaining protrusion 220. This ensures that after the retaining ring 500 is installed to the luminaire body 400, the retaining protrusion 220 is abutted against the protruding guide rail 331 of the second connecting structure 330, maintaining the mounting stability of the retaining ring 500.

In one embodiment, as shown in FIGS. 1 and 2, the retaining ring switching structure includes more than two connecting members 300, and a same number of luminaire body connecting structures 100 are symmetrically arranged on the luminaire body 400, and a same number of retaining ring connecting structures 200 are symmetrically arranged on the retaining ring 500. A plurality of luminaire body connecting structures 100 are symmetrically arranged about a central axis of the luminaire body 400, and a plurality of retaining ring connecting structures 200 are symmetrically arranged about a central axis of the retaining ring 500. Numbers of the luminaire body connecting structures 100, the retaining ring connecting structures 200, and the connecting members 300 are equal to ensure balance of an overall structure after the retaining ring 500 is connected to the luminaire body 400, and improving the stability of the retaining ring 500 after installation.

The retaining ring switching structure of the present disclosure includes the luminaire body connecting structures 100 arranged on the luminaire body 400, the retaining ring connecting structures 200 arranged on the retaining ring 500, the first connecting structures 320 arranged on the connecting member 300 to correspond to the luminaire body connecting structures 100, and the second connecting structures 330 arranged on the connecting member 300 to correspond to the retaining ring connecting structures 200. After the connecting member 300 is fixed to the luminaire body 400 through the first connecting structure 320 and the luminaire body connecting structures 100, the retaining ring 500 is rotated to enable the second connecting structure 330 to be latched to the retaining ring connecting structure 200, thereby achieving fixed installation of the retaining ring 500 to the luminaire body 400. Furthermore, the retaining ring 500 can be installed and removed without installing and removing the luminaire body 400 from the mounting surface, making the operation convenient and efficient, and allowing the user to replace the retaining rings of the luminaire body at any time as needed to provide different visual effects.

Figure 3:
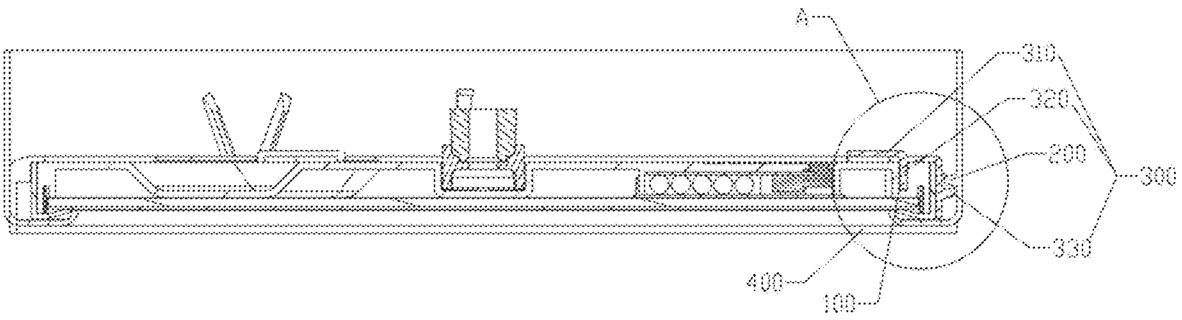
FIG. 3 is a cross-sectional view of a luminaire according to the present disclosure.

The present disclosure further provides a luminaire, as shown in FIGS. 1 and 3. The luminaires provided with the aforesaid retaining ring switching structure to connect the luminaire body 400 and the retaining ring 500, thereby enabling rapid installation and removal of the luminaire body 400 and the retaining ring 500.

The retaining ring switching structure and a luminaire incorporating the retaining ring switching structure of the present disclosure are described in detail below with reference to specific embodiments.

In this embodiment, the luminaire body 400 and the retaining ring 500 are assembled in place using the retaining ring switching structure to form a luminaire. Specifically, the retaining ring switching structure includes a luminaire body connecting structure 100, a retaining ring connecting structure 200 and a connecting member 300. After the connecting member 300 is fixed to the luminaire body 400 through the first connecting structure 320 and the luminaire body connecting structure 100, the retaining ring 500 is rotated to enable the second connecting structure 330 to be latched to the retaining ring connecting structure 200, thereby achieving fixed installation of the retaining ring 500 to the luminaire body 400.

Specifically, as shown in FIG. 2, the luminaire body connecting structure 100 is disposed on a top surface of the luminaire body 400, that is, on the mounting surface of the wall. Further, the luminaire body connecting structure 100 is formed as a parabolic slot 101, and the slot 101 extends downward perpendicular to the top surface of the luminaire body 400. In this embodiment, the luminaire body 400 has a disc-like structure. On the top surface of the luminaire body 400, three luminaire body connecting structures 100 (that is, three parabolic slots 101) are symmetrically arranged about a center of the luminaire body 400 as a symmetrical center. Each two adjacent slots 101 forms an angle of 120° about a centerline of the luminaire body 400, thereby ensuring a balanced and stable connection when installing the retaining ring 500.

Further, as shown in FIGS. 1 and 2, in this embodiment, three connecting members 300, one for each of the three luminaire body connecting structures 100, are arranged on the luminaire body 400. Each connecting member 300 includes a body 310 shaped to conform to the luminaire body 400, a first connecting structure 320 disposed on the body 310 and facing the luminaire body 400, and a second connecting structure 330 disposed on the body 310 and facing the retaining ring 500.

Specifically, in this embodiment, the body 310 is provided with a planar plate parallel to the top surface of the luminaire body 400, and a curved plate perpendicular to the planar plate and parallel to a side wall of the luminaire body 400. The planar plate extends perpendicularly toward and relative to the top surface of the luminaire body 400 to form a rib 321, which serves as the first connecting structure 320, and the rib 321 is shaped to match the slot 101, that is, a cross-section of the rib 321 in a vertical extending direction is parabolic. After being inserted into the slot 101, the rib 321, through the parabolic structural design, restricts the movement of the connecting member 300 in a horizontal plane direction. When the second connecting structure 330 is latched to the retaining ring connecting structure 200 of the retaining ring 500, the rib 321 is engaged with the slot 101 under torque, further restricting movement of the connecting member 300 in a vertical direction, thereby achieving a fixed and stable connection between the connecting member 300 and the luminaire body 400. In other embodiments, the connecting member 300 and the luminaire body 400 may also be fixed through interference fit through adjustment of width and inclination angle of the slot 101 relative to the rib 321.

Further, as shown in FIGS. 5 and 6, a handle 311 is formed on the planar plate of the body 310, projecting vertically upward in correspondence with the rib 321, so as to facilitate the insertion of the rib 321 into the slot 101 and removal of the rib 321 from the slot 101 by the user. In this embodiment, the handle 311 is formed as an arched notch extending upward from the planar plate, allowing the user to grasp and apply force to insert the rib 321 into the slot 101 for fixing the connecting member 300 to the luminaire body 400, or to pull the rib 321 out of the slot 101 for separating the connecting member 300 from the luminaire body 400. The handle 311 is arranged directly above the rib 321, enabling the user to apply force easily.

Further, as shown in FIG. 5, a second connecting structure 330 is arranged on a side of the curved plate of the body 310 facing the retaining ring 500. In this embodiment, as shown in FIGS. 8 and 9, the second connecting structure 330 is perpendicular to a protruding guide rail 331 of the curved plate extending in a helical direction. The protruding guide rail 331 extends downward in a circumferential direction of the curved plate, forming an inclined surface from a highest end 333 to a lowest end 332. A stop member 334 is vertically formed at the lowest end 332. After the connecting member 300 is fixedly connected to the retaining ring 500 through the protruding guide rail 331, the stop member 334 is configured to prevent the corresponding structure inside the retaining ring 500 from slipping off the lowest end 332. In this embodiment, for the second connecting structure 330, an inclined surface is formed between the highest end 333 and the lowest end 332 of the protruding guide rail 331, and a flat surface section is formed at the lowest end 332, such that a sliding speed of the retaining ring 500 along the protruding guide rail 331 is controlled, preventing the retaining ring from overrunning the stop member 334, and causing the retaining ring 500 to disengage.

Further, as shown in FIG. 2, in this embodiment, the retaining ring 500 is an annular structure corresponding to the luminaire body 400, and an inner diameter of the retaining ring 500 is greater than an outer diameter of the luminaire body 400. A supporting base 210 extends vertically inward from a bottom of the retaining ring 500, a through hole is formed in the supporting base 210 to allow an illumination portion of the luminaire body 400 to be exposed and to support the luminaire body 400, ensuring fixed installation of the retaining ring 500 relative to the luminaire body 400. Specifically, as shown in FIG. 4, a retaining protrusion 220 is dispose d above the supporting base 210. A retaining groove 230 is formed between the retaining protrusion 220 and the supporting base 210. The connecting member 300 may be latched to the retaining ring 500 by engaging the rib 321 with the retaining groove 230. Specifically, when the luminaire body 400 is placed on the supporting base 210, a height between the lowest end 332 of the protruding guide rail 331 and the supporting base 210 is less than a height between the retaining protrusion 220 and the supporting base 210, and a height between the highest end 333 of the protruding guide rail 331 and the supporting base 210 is greater than the height between the retaining protrusion 220 and the supporting base 210, this ensures that the protruding guide rail 331 can be screwed into the retaining groove 230 and stably retained therein.

Specifically, as shown in FIG. 2, the retaining protrusion 220 is configured as parabolic protrusion with an upward opening, and a retaining groove 230 is formed at its lowest point corresponding to the supporting base 210. After the luminaire body 400, with the connecting member 300 installed, is placed into the retaining ring 500, rotation of the retaining ring 500 causes the second connecting structure 330, i.e., the protruding guide rail 331, of the connecting member 300 to rotate into the retaining groove 230. The protruding guide rail 331 is then retained through the cooperation between the retaining protrusion 220 and the supporting base 210, thereby achieving a retaining connection between the connecting member 300 and the retaining ring 500, and enabling the retaining ring 500 to be securely installed to the luminaire body 400. In this embodiment, the retaining protrusion 220 is configured as a parabolic shape to enhance mechanical strength of the structure, thereby preventing damage to the retaining protrusion 220 caused by excessive force during installation, which could affect the stable installation of the retaining ring 500. After the retaining ring 500 and the luminaire body 400 are installed and put into use, when the retaining ring 500 displaces relative to the luminaire body 400 under the influence of gravity, that is, the retaining protrusion 220 slides along the protruding guide rail 331, and the retaining protrusion 220 is eventually abutted against the stop member 334 at the lowest end 332 of the protruding guide rail 331, preventing the retaining ring 500 from sliding further downward and separating from the luminaire body 400, thereby ensuring a stable connection between the retaining ring 500 and the luminaire body 400.

In the retaining ring switching structure for a luminaire body of the present disclosure, the connecting member 300 is used as a connecting tool between the luminaire body 400 and the retaining ring 500, the retaining ring 500 may be installed or removed without removing the luminaire body 400 from a mounting surface. This reduces the operating space required, simplifies the installation and removal process, and enables a user to replace different retaining rings mounted on the luminaire body as needed at any time.

A use process of the retaining ring switching structure for a luminaire body of the present disclosure is briefly described as follows:

First, the connecting members are connected to the luminaire body. According to the number of luminaire body connecting structures provided on the luminaire body, the same number of connecting members are arranged in a one-to-one manner. The first connecting structure of the connecting members is inserted into the corresponding luminaire body connecting structure on the luminaire. By means of the handle disposed on the connecting members, the rib of the first connecting structure can be quickly inserted into the slot of the luminaire body connecting structure, and likewise, the rib can be quickly pulled out of the slot. Then, the luminaire body with the connecting members installed is placed into the retaining ring. The supporting base supports the luminaire body, and the connecting members installed on the luminaire body are aligned with the corresponding retaining protrusions on the retaining ring. The lowest end of the protruding guide rail of the second connecting structure of each connecting member faces the retaining groove formed between the retaining protrusion and the supporting base. By rotating the retaining ring or the luminaire body, the protruding guide rail of the second connecting structure is rotated into the retaining groove and is abutted against the retaining protrusion, thereby achieving a fixed connection between the retaining ring and the connecting members, and consequently installing the retaining ring to the luminaire body. After the luminaire body is installed in place, the retaining ring tends to slide downward under the action of gravity, causing the retaining protrusion to move in an inclined direction of the protruding guide rail and eventually abut against the stop member, preventing the retaining ring from further moving and falling off the connecting member, thereby ensuring a stable connection between the retaining ring and the luminaire body. When the retaining ring needs to be replaced, it is unnecessary to remove the luminaire body from its mounting position. The retaining ring is slightly lifted upward to separate the retaining protrusion from the stop member, and the retaining ring is then rotated in a reverse direction of installation, allowing the retaining ring to be detached from the luminaire body. A different retaining ring of varying shape and appearance can be installed as needed to provide different visual effects for the luminaire body.

Therefore, the retaining ring switching structure for a luminaire body of the present disclosure enables quick installation and removal of the connecting members and the luminaire body through the cooperation of the first connecting structure and the luminaire body connecting structure, and enables quick installation and removal of the connecting members and the retaining ring through the cooperation of the second connecting structure and the retaining ring connecting structure, thereby achieving installation and removal of the retaining ring relative to the luminaire body without requiring additional operating space, reducing the difficulty of the installation and removal process, improving the installation and removal efficiency of the retaining ring, and allowing the user to easily replace the retaining rings as needed to provide different visual effects for the luminaire.

In summary, the present disclosure provides a retaining ring switching structure for a luminaire body and a luminaire. The retaining ring switching structure is configured to connect the luminaire body to various retaining rings, and includes a luminaire body connecting structure disposed on the luminaire body, a retaining ring connecting structure disposed on the retaining ring, and a connecting member disposed between the luminaire body and the retaining ring. The connecting member includes a body shaped to conform to the luminaire body; a first connecting structure disposed on a side of the body corresponding to the luminaire body, and matching the luminaire body connecting structure to achieve a detachable connection between the connecting member and the luminaire body, and a second connecting structure disposed on a side of the body corresponding to the retaining ring, and matching the retaining ring connecting structure to achieve a detachable connection between the connecting member and the retaining ring. Accordingly, the luminaire body is connected to various retaining rings through the connecting member. The retaining ring switching structure for a luminaire body of the present disclosure achieves the installation of the luminaire body and the retaining ring through cooperation between a connecting member and connecting structures respectively provided on the luminaire body and the retaining ring, reducing an operating space needed for installing and removing the retaining ring, thereby enabling convenient and efficient installation and removal of the retaining ring even when the mounting surface of the luminaire body fits snugly against the wall. This ensures operational efficiency when replacing the retaining ring for the luminaire body and facilitates further market promotion.

It should be understood that the application of the present disclosure is not limited to the above examples. For those ordinarily skilled in the art, improvements or variations can be made based on the foregoing description, and all these improvements or variations shall fall within the scope of protection of the appended claims of the present disclosure.

What is claimed is:

1. A retaining ring switching structure for a luminaire body, wherein the retaining ring switching structure is configured to connect the luminaire body to various retaining rings, and comprises a luminaire body connecting structure disposed on the luminaire body, a retaining ring connecting structure disposed on the retaining ring, and a connecting member disposed between the luminaire body and the retaining ring; wherein the connecting member comprises:

a body, wherein the body is shaped to conform to the luminaire body;

a first connecting structure, wherein the first connecting structure is disposed on a side of the body corresponding to the luminaire body, and matches the luminaire body connecting structure to achieve a detachable connection between the connecting member and the luminaire body; and a second connecting structure, wherein the second connecting structure is disposed on a side of the body corresponding to the retaining ring, and matches the retaining ring connecting structure to achieve a detachable connection between the connecting member and the retaining ring, enabling the luminaire body to be connected to various retaining rings through the connecting member.

2. The retaining ring switching structure for a luminaire body according to claim 1, wherein the first connecting structure is a rib extending perpendicularly from the body toward the luminaire body, and the luminaire body connecting structure is a slot that matches the rib; and the rib is inserted into the slot to achieve the detachable connection between the connecting member and the luminaire body.

3. The retaining ring switching structure for a luminaire body according to claim 2, wherein a cross-section of the rib perpendicular to an extending direction of the rib is parabolic, and the slot is a parabolic slot corresponding to the rib to restrict relative movement between the connecting member and the luminaire body after the rib is inserted into the slot.

4. The retaining ring switching structure for a luminaire body according to claim 2, wherein a handle is formed on the body away from the extending direction of the rib to facilitate insertion of the rib into the slot and removal of the rib from the slot.

5. The retaining ring switching structure for a luminaire body according to claim 2, wherein the retaining ring connecting structure comprises:

a supporting base, wherein the supporting base is arranged to extend inwardly in a direction perpendicular to the retaining ring for supporting the luminaire body; and a retaining protrusion, wherein the retaining protrusion is fixed to an inner side of the retaining ring, and a retaining groove is formed between the retaining protrusion and the supporting base; and the retaining ring is detachably connected to the connecting member via the retaining groove.

6. The retaining ring switching structure for a luminaire body according to claim 5, wherein the second connecting structure is a protruding guide rail extending in a helical direction; and the protruding guide rail is screwed into the retaining groove to achieve the detachable connection between the connecting member and the retaining ring.

7. The retaining ring switching structure for a luminaire body according to claim 6, wherein a stop member is formed by a protrusion at a lowest end perpendicular to the protruding guide rail to prevent the retaining ring from slipping off the connecting member.

8. The retaining ring switching structure for a luminaire body according to claim 5, wherein the retaining protrusion is parabolic in shape, and a retaining groove is formed between a lowest point of the retaining protrusion and the supporting base.

9. The retaining ring switching structure for a luminaire body according to claim 1, comprising more than two connecting members, and a same number of luminaire body connecting structures are symmetrically arranged on the luminaire body, and a same number of retaining ring connecting structures are symmetrically arranged on the retaining ring.

10. A luminaire, comprising the retaining ring switching structure for a luminaire body and the retaining ring according to claim 1.

* * * * *